UNITED STATES PATENT OFFICE.

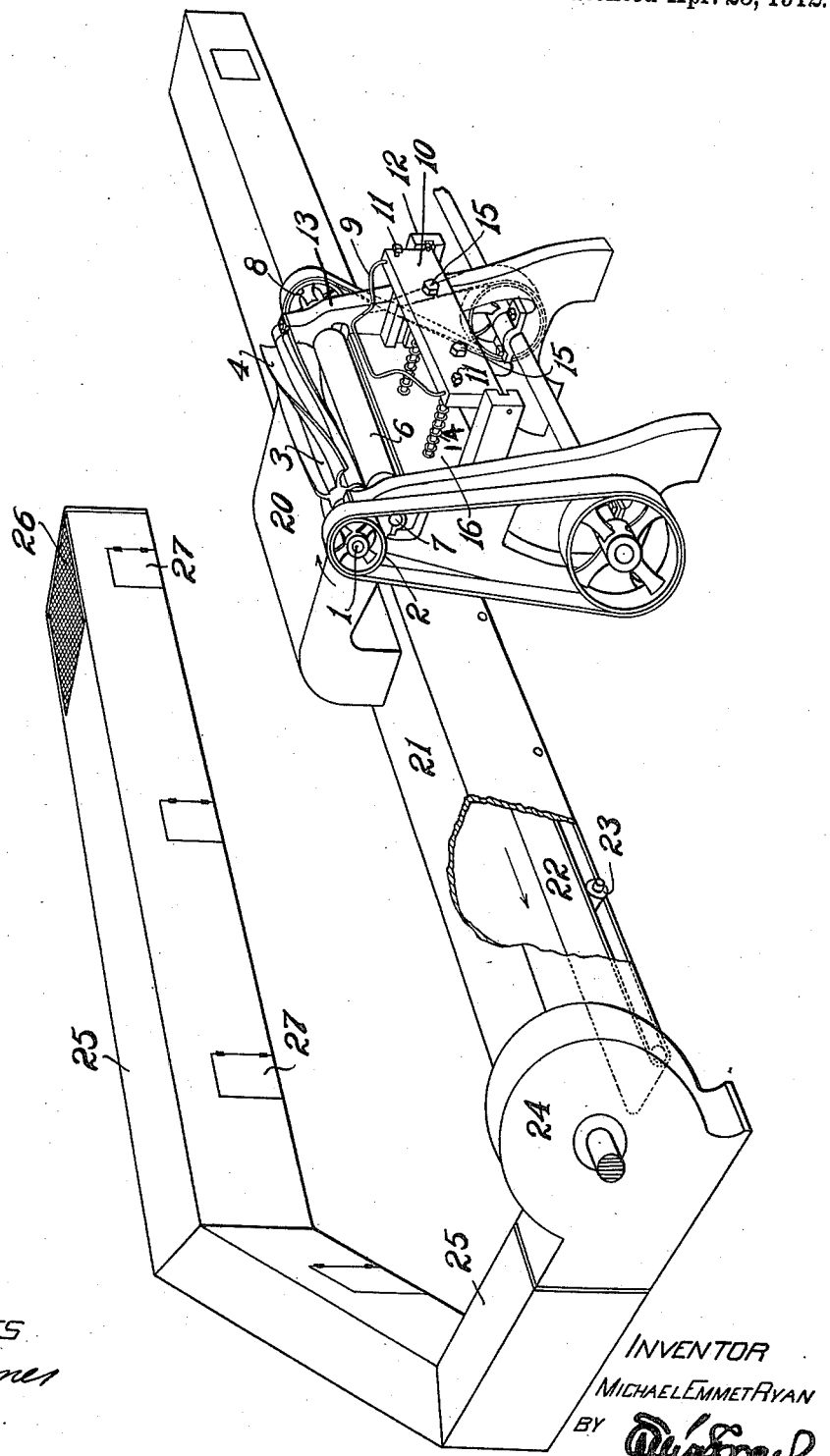

MICHAEL EMMET RYAN, OF FALL RIVER, MASSACHUSETTS.

APPARATUS FOR COLLECTING AND ASSORTING FIBERS.

1,024,148. Specification of Letters Patent. Patented Apr. 23, 1912.

Application filed April 22, 1909. Serial No. 491,460.

*To all whom it may concern:*

Be it known that I, MICHAEL EMMET RYAN, a citizen of the United States, residing at Fall River, county of Bristol, Commonwealth of Massachusetts, have invented certain new and useful Improvements in Apparatus for Collecting and Assorting Fibers, of which the following is a specification.

This invention relates to the collection and assortment of fibers and particularly to such use in connection with machines which shave a portion of the fiber growth from a fur pelt. In this art it is always important to save the hair or fiber growth as each part of such growth is of value.

It is the object of my present invention to provide apparatus for collecting and assorting various kinds of hair and fiber found on a fur bearing pelt after the same has been shaved, clipped or cut therefrom.

The construction and operation of my apparatus will be more fully described in the specification which follows. In that specification and in the drawings which form a part of it, I shall make particular reference to and have shown a form of my invention which I find well adapted to practical use.

Throughout specification and drawings like reference numerals are employed to indicate corresponding parts and in the drawings is shown a perspective view of a collecting and assorting system in conjunction with a shaving machine.

As affording a basis for the understanding of such a product as my apparatus is adapted to handle, I will first describe a shaving machine which I have chosen as an illustrative example of the source of supply for my collector and distributer. This machine consists of a shaft 1, driven by a pulley 2 on which is a shell 3 having spiral knives 4. Below this rotary cutter just described is a cylindrical support 6, preferably composed of rubber, mounted on a shaft 7, suitably driven by a pulley 8. A bar 9 adjustably mounted in the slide 10 moves in slideways 12 in the frame 13, and is normally held out by the springs 14. The skin or pelt is drawn across the central portion of the bar 9 by the workman, and advanced or allowed to retreat by the position of the body of the workman against the slide 10. The pelt folded across the bar 9 is therefore advanced so that the tips of the growth on the pelt is brought between the rapidly rotating blades 7 and the support 6 so that the tips of the fibers may be shaved off.

Behind the shaving knives 4 is a flue or conductor 20 leading to a conduit 21 in which a belt 22 runs in the direction of the arrow in Fig. 1 on rollers 23. At the end of the conduit 21 is a fan 24 which draws through the conduit 21 and the conductor 20 the shaved hairs which are left by the shaving knives 4 after they are cut from the pelt. The fan 24 makes a draft through the conduit 21 and draws through all of the finer portions of the shaved hairs. The heavier portions are collected on the belt 22 and are conveyed to the base of the fan from which they are distributed, together with the finer particles, and carried by the air into the conduit 25. At the end of the conduit 25 is a screen 26 and in the side of the conduit are traps 27. The screen 26 prevents the escape of the finest and lightest of hairs which are carried to the end of the conduit 25, while the traps 27 which are arranged along the conduit at intervals permit access to the interior of the conduit to take up the various weights of hair or fiber as they are deposited along the length. As the hairs are carried through the conduit 25 they will be deposited in the order of their weight, the lighter particles being carried farthest. In this manner the clipped hair is automatically sorted into the grades. In this manner I am able to secure from my waste hairs those finer grades which bring a much higher price than do the cheaper grades comprising hair in which the coarser grades are present.

In addition to the hair clipped by the machine described, they will also be present the loose or dead hairs which fly from the pelt or are stripped off along the heated creases or folds which form in the furs during shipment. These fibers are all collected in my apparatus and are sorted as of value. It will therefore be seen that by my apparatus a material which as it comes from the cutters in mixed condition is practically waste and worth no more than the value of fibers of the coarsest grade, is converted into a useful graded product in which soft hairs are rendered available at their full value, while the less valuable grades are each made available for separate uses.

Various modifications may obviously be made and are intended to be included as within the spirit of my invention if within the limits of the appended claims.

What I therefore claim and desire to secure by Letters Patent is:—

1. In a device of the class described, a conduit, means for shaving the hairs of a pelt, means for delivering the shaved hairs in said conduit, an endless belt in said conduit adapted to receive and convey said shaved hairs, a blower at the point of return of said endless belt and disposed with its intake adjacent thereto, a second conduit connected to the delivery of said blower and said second conduit having openings for the removal of distributed hairs at predetermined points along said conduit.

2. In a device of the class described, a conduit, a receiver for hairs and suitably connected to deliver said hairs to said conduit, an endless belt in said conduit adapted to receive and convey said hairs, a blower at the point of return of said endless belt and disposed with its intake adjacent thereto, a second conduit connected to the delivery side of said blower and openings along said second conduit for the removal of distributed hairs at predetermined points.

In testimony whereof, I affix my signature in presence of two witnesses.

MICHAEL EMMET RYAN.

Witnesses:
EDWARD F. HANIFY,
THOMAS F. HAGGINS.

Copies of this patent may be obtained for five cents each, by addressing the "Commissioner of Patents, Washington, D. C."